(12) United States Patent
Disch et al.

(10) Patent No.: US 12,622,567 B2
(45) Date of Patent: May 12, 2026

(54) DISHWASHER WITH HEAT RECOVERY APPARATUS

(71) Applicant: ILLINOIS TOOL WORKS INC., Glenview, IL (US)

(72) Inventors: Harald Disch, Elzach (DE); Martin Schrempp, Biberach (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 66 days.

(21) Appl. No.: 18/412,025

(22) Filed: Jan. 12, 2024

(65) Prior Publication Data

US 2024/0237875 A1      Jul. 18, 2024

(30) Foreign Application Priority Data

Jan. 16, 2023      (DE) ..................... 10 2023 100 906.0

(51) Int. Cl.
*A47L 15/42*          (2006.01)
*A47L 15/00*          (2006.01)
          (Continued)

(52) U.S. Cl.
CPC ....... *A47L 15/4291* (2013.01); *A47L 15/0078* (2013.01); *A47L 15/24* (2013.01); *A47L 15/483* (2013.01); *F25B 30/02* (2013.01); *A47L 15/0076* (2013.01); *A47L 15/241* (2013.01); *Y02B 30/52* (2013.01)

(58) Field of Classification Search
CPC .... A47L 15/4291; A47L 15/24; A47L 15/483; A47L 15/0078; A47L 15/241; A47L 15/0076; F25B 30/02; Y02B 30/52
See application file for complete search history.

(56) References Cited

U.S. PATENT DOCUMENTS

2014/0238450 A1*   8/2014   Bertram .............. A47L 15/0042
                                                                134/18
2017/0027404 A1*   2/2017   Anim-Mensah .... A47L 15/4285
                                    (Continued)

FOREIGN PATENT DOCUMENTS

CH            699692 A2      3/2010
DE            7440114 U     10/1975
                  (Continued)

OTHER PUBLICATIONS

Machine Translation of DE 102013224440 A1 to Disch et al., May 2015. (Year: 2015).*

*Primary Examiner* — Benjamin L Osterhout
(74) *Attorney, Agent, or Firm* — THOMPSON HINE LLP

(57)                ABSTRACT

A dishwasher includes a heat recovery apparatus to recover thermal energy of the wastewater and/or exhaust air and to transfer the thermal energy to at least one treatment liquid to be sprayed and/or to a drying air. A primary circulation system has a heat pump assembly and a secondary circulation system. A heat exchanger unit of the heat pump assembly enables at least a portion of the thermal energy transferred to refrigerant of the primary circulation system to be transferred to a carrier medium in the secondary circulation system. A heat exchanger unit of the secondary circulation system enables at least a portion of the thermal energy transferred to the carrier medium to be transferred as utility heat to the treatment liquid and/or to the drying air.

16 Claims, 2 Drawing Sheets

(51) Int. Cl.
 *A47L 15/24*   (2006.01)
 *A47L 15/48*   (2006.01)
 *F25B 30/02*   (2006.01)

(56)     References Cited

U.S. PATENT DOCUMENTS

| | | | |
|---|---|---|---|
| 2017/0027407 A1* | 2/2017 | Mills | A47L 15/4291 |
| 2017/0027408 A1* | 2/2017 | Paulus | A47L 15/241 |
| 2017/0027409 A1* | 2/2017 | Anim-Mensah | F25B 39/00 |
| 2017/0101900 A1* | 4/2017 | Goto | F01K 7/44 |
| 2019/0242595 A1* | 8/2019 | Eplee | F24F 13/30 |
| 2019/0282060 A1* | 9/2019 | Neumaier | A47L 15/4295 |
| 2021/0100422 A1* | 4/2021 | Stevens | A47L 15/4285 |

FOREIGN PATENT DOCUMENTS

| | | | | | |
|---|---|---|---|---|---|
| DE | 102005023429 A1 | 11/2006 | | | |
| DE | 102009028011 A1 | 2/2010 | | | |
| DE | 102013224440 A1 * | 5/2015 | | | F25B 30/06 |
| DE | 102014208813 A1 | 11/2015 | | | |
| DE | 102019003366 A1 | 11/2020 | | | |
| EP | 2050381 A2 | 4/2009 | | | |
| EP | 2215954 A1 | 8/2010 | | | |
| ES | 2767722 A1 | 6/2020 | | | |
| KR | 20100058320 A | 6/2010 | | | |

* cited by examiner

DISHWASHER WITH HEAT RECOVERY APPARATUS

TECHNICAL FIELD

The present invention relates generally to the field of commercial washing, in particular. Specifically, the present invention relates to a dishwasher, in particular commercial dishwasher, which is configured as a box-type dishwasher or as a conveyor dishwasher.

According to one aspect of the invention, this relates in particular to a conveyor dishwasher having a conveyor apparatus for conveying washware through the individual treatment zones of the conveyor dishwasher, wherein the conveyor dishwasher comprises at least one washing zone in which washing liquid from a washing tank associated with the washing zone is sprayed onto the washware. The conveyor dishwasher according to this aspect of the invention further comprises at least one rinsing zone arranged behind the at least one washing zone when viewed in the conveying direction of the washware, in which rinsing zone rinsing liquid is sprayed onto the washware. Furthermore, the conveyor dishwasher comprises an exhaust system for removing exhaust air from the conveyor dishwasher that is produced during operation of the machine A conveyor dishwasher according to the present invention is, in particular, a slight-type dishwasher or a rack conveyor dishwasher.

A conveyor dishwasher of the aforementioned type is known in principle from the prior art and is typically used in the commercial realm. In contrast to so-called box-type dishwashers, in which the washware to be cleaned remain stationary in the machine during cleaning, in conveyor dishwashers the washware are conveyed through different treatment zones of the conveyor dishwasher.

A conveyor dishwasher typically comprises as treatment zones at least one pre-washing zone and at least one main washing zone located downstream of the pre-washing zone (s) when viewed in the conveying direction of the washware. When viewed in the conveying direction, at least one rinsing zone is typically arranged downstream of the main washing zone(s).

It is also known to provide at least one additional post-washing zone or pre-rinsing zone between the main washing zone and the rinsing zone.

When viewed in the conveying direction of the washware, the washware which has either been received directly on the conveyor belt or is held by racks typically travels through an inlet tunnel, the subsequent pre-washing zone(s), main washing zone(s), post-washing zone(s) if provided, rinsing zone(s), a drying zone, and into an outlet path.

The aforementioned washing zones of the conveyor dishwasher (pre-washing zone(s), main washing zone(s), and, if provided, post-washing zone(s)) are each associated with a washing system comprising a washing pump and a conduit system connected to the washing pump, via which washing liquid is fed to respective spraying nozzles of the washing zones. The washing liquid fed to the spraying nozzles is sprayed onto the washware in the respective washing zone, which is conveyed by a conveyor apparatus of the conveyor dishwasher through the respective washing zones.

Each washing zone has an associated washing tank in which sprayed liquid is received and/or in which liquid for the spraying nozzles of the respective zones is provided.

In conveyor dishwashers known from the prior art, rinsing liquid in the form of fresh water, which can be pure or can be mixed with further additives such as a rinsing agent, is sprayed via the spraying nozzles of the rinsing zone onto the washware. At least a portion of the sprayed rinsing liquid is conveyed from treatment zone to treatment zone in a cascading system counter to the conveying direction of the washware.

The sprayed rinsing liquid is collected in a tank (post-washing tank) of the post-washing zone, from which it is conveyed via the washing pump system of the washing system belonging to the post-washing zone to the spraying nozzles (post-washing nozzles) of the post-washing zone. In the post-washing zone, washing liquid is rinsed off of the washware. The resulting liquid flows into the washing tank of the at least one main washing zone, which is upstream of the post-washing zone when viewed in the conveying direction of the washware. Here, a cleaning agent is typically added to the liquid, and then the liquid is sprayed onto the washware by a pumping system belonging to the washing system of the main washing zone (washing pump system) via the nozzles (washing nozzles) of the main washing zone.

From the washing tank of the main washing zone, the liquid then flows into the pre-washing tank of the pre-washing zone, unless a further main washing zone is provided. The liquid in the pre-washing tank is sprayed onto the washware by a pumping system belonging to the washing system of the pre-washing zone via the pre-washing nozzles of the pre-washing zone, in order to remove coarse impurities from the washware.

In the field of commercial dishwashing, there are different standards and guidelines that define the hygiene performance requirements of cleaning processes and their procedural inspections. All standards and guidelines have in common that, during the cleaning process, minimum temperatures are required for the washing and rinsing zones of the commercial dishwasher. In this way, at least a partial thermal disinfection is to take place, among other things.

The requirements with respect to the specified minimum temperatures in the relevant treatment zones of the conveyor dishwasher result in the use of a relatively large amount of energy in the operation of the commercial dishwasher in order to heat the washing or rinsing liquids to the required minimum temperatures. On the other hand, in currently known conveyor dishwashers, up to 55% of the energy introduced during operation of the conveyor dishwasher is discharged as waste heat in the form of wastewater and exhaust air.

The problem discussed above with reference to a conveyor dishwasher, namely that, during the operation of the dishwasher, a majority of the energy introduced during operation of the machine is released as waste heat in the form of wastewater and exhaust air, also exists in the case of dishwashers, in particular commercial dishwashers, which are configured as a box-type dishwasher.

Box-type dishwashers are manually loadable and unloadable dishwashers. The box-type dishwashers (also referred to as "batch dishwashers") can be tableware rack sliding dishwashers ("hood-type dishwashers") or front loaders ("front loader dishwashers"). Front loaders can be under-counter machines, top-counter machines, or free-standing front loaders.

A dishwasher configured as a box-type dishwasher typically comprises a treatment chamber for the cleaning of washware. Typically, a washing tank is arranged below the treatment chamber, in which liquid can flow back from the treatment chamber due to gravity. In the washing tank, there is washing liquid, which is typically water, to which a cleaning agent can be added.

A dishwasher configured as a box-type dishwasher typically further comprises a washing system having a washing pump, a conduit system connected to the washing pump, and a nozzle system having at least one washing nozzle. The washing liquid located in the washing tank can be conveyed from the washing pump via the conduit system to the washing nozzles and, through the washing nozzles, sprayed onto the washware to be cleaned in the treatment chamber. The sprayed washing liquid subsequently flows back into the washing tank.

Such a dishwasher configured as a box-type dishwasher is known, for example, from the publication DE 10 2005 023 429A1.

In particular, the term "washware" as used herein should be understood to refer to crockery, glasses, cutlery, cooking utensils, oven utensils, and serving trays.

A commercial dishwasher configured as a box-type dishwasher differs from a domestic dishwasher in particular in that a commercial dishwasher must be designed in such a way that, depending on the cleaning program selected, cycle times of between one and five minutes can be realized, while domestic dishwashers typically have run times of up to 2.5 hours or more. Due to the short program duration required for commercial dishwashers, household dishwasher techniques are not readily transferable to commercial dishwashers.

Commercial dishwashers configured as a box-type dishwasher typically operate in two main process steps: a first step involving washing with a washing liquid and a second step involving rinsing with heated fresh water and dosed rinse aid.

In order to perform these process steps, a commercial dishwasher configured as a box-type dishwasher is typically equipped with two independent liquid systems that are completely separated from one another. The one liquid system is a washing water circuit which is responsible for washing the washware, wherein the washing is carried out with recirculated water from the washing tank of the dishwasher. The other liquid system is a fresh water system, which is responsible for rinsing. The rinsing is carried out with fresh water, preferably fresh water from a boiler. After the spraying, the fresh water is likewise taken into the washing tank of the dishwasher.

The primary task of rinsing is to remove any remaining lye on the washware. The rinsing water flowing in the washing tank during the rinsing step is additionally used in order to regenerate the washing water in the washing tank.

Before fresh water is sprayed as a rinsing liquid during the rinsing and thereby fed into the washing tank of the dishwasher, a quantity of washing liquid equal to the quantity of fresh water is pumped out of the washing tank.

Typically, commercial dishwashers configured as a box-type dishwasher are equipped with a plurality of programs. These programs are distinguished primarily by differently long program run times of the washing process. The operator has the option of selecting a short washing program for lightly soiled washware or selecting a correspondingly longer washing program for heavily soiled washware.

Commercial dishwashers configured as a box-type dishwasher for batch-wise loading and unloading of the treatment chamber with washware are, in particular, front-loading machines or rack push-through machines. For front-loading machines, the washware is placed in a rack, and the rack loaded with washware is placed in the treatment chamber of the dishwasher through a front door and removed again through the front door after cleaning. In rack push-through machines, the tableware racks loaded with washware are manually pushed from an input side into the treatment chamber and, after completion of a washing program, manually removed from an output side of the treatment chamber. Front-loading machines and rack push-through machines contain only a single treatment chamber for treating the washware. The front-loading machines can be under-counter machines or table-top machines.

Commercial dishwashers that are designed as a box-type dishwasher mainly use two drying methods. In the first method, the washware that is still hot after the rinsing process is removed from the machine, where it then dries in the ambient air for four to ten minutes. In the aforementioned method, in order to dry the washware, it is usually left in the racks in which it was placed for cleaning in the dishwasher.

According to the second method, air drying occurs within the treatment chamber of the dishwasher. Here, fresh air drying systems are used. Such fresh-air drying systems for commercial front-loading or under-counter dishwashers always operate at a high airflow rate in the range of 25 to 100 $m^3$ per hour in order to allow the washware remaining in the treatment chamber to dry in a very short time. The high airflow rates are due to the brevity of the drying process in the commercial field. Compared to conventional drying of a domestic dishwasher, the active drying time of a commercial dishwasher is many times shorter. While programmed run-time drying in a domestic dishwasher is approximately 30 minutes to 2.5 hours, programmed run-time drying in commercial use is between 1.5 and 5 minutes.

During air-drying in a commercial dishwasher configured as a box-type dishwasher, fresh air is drawn in from the outside and passed through the treatment chamber of the dishwasher in order to take up moisture from the washware to be dried. Typically, the drying air loaded with moisture is then blown out as exhaust air into the room where the dishwasher is installed.

In particular in kitchens where a plurality of dishwashers configured as a box-type dishwasher are operated at the same time, blowing the drying air into the room leads to a negative impact on the room climate, because, due to the blowing of drying air loaded with moisture and warm drying air in comparison to the air in the room, the moisture content of the air in the room (ambient air) is necessarily increased. In particular, there is a risk that the moisture content of the air in the room is increased to the extent that undesirable condensation of water vapor occurs, in particular on cool interfaces in the room Apart from this, the shortened drying time required for box-type dishwashers necessarily comes with increased energy consumption in order to heat the drying air accordingly.

In order to conserve resources, in particular energy, in the operation of a dishwasher, whether it is a machine designed as a box-type dishwasher or as a conveyor dishwasher, it is already known from the prior art to use wastewater and exhaust air heat recovery systems with which at least a portion of the kinetic energy of the wastewater and/or the exhaust air of the machine can be recovered as utility heat.

In this regard, for example, reference is made to the publication DE 10 2014 208 813A1, which relates to a conveyor dishwasher with a heat recovery apparatus.

In the conveyor dishwasher known from this prior art, a heat pumping device is used as the exhaust air heat recovery system. With the aid of this heat pumping device, a portion of the kinetic energy of the exhaust air of the conveyor dishwasher is transferred to a refrigerant circulating in the heat pumping device. In so doing, the kinetic energy to be recovered is take up by vaporizing the refrigerant at low pressure in a vaporizer device. The gaseous refrigerant is subsequently compressed by a compressor unit to a higher pressure level and then liquefied in a liquefier unit at a high temperature. The refrigerant is then relaxed back to the vaporization pressure again with the aid of an expansion valve device. The liquefaction temperature of the refrigerant in the liquefier unit is used in order to heat the rinsing liquid or washing liquid of the conveyor dishwasher. For this purpose, a corresponding heat exchanger is provided in the rinsing liquid tank or washing liquid tank.

Thus, the heat pumping technology represents an effective method for recovering the energy stored in the moist exhaust air of a dishwasher. The moist airflow of the exhaust air of the dishwasher can be guided via a vaporizer device of a cooling system, as a result of which the machine exhaust air is cooled to the ambient level. Through the energy transfer, the refrigerant of the heat pump evaporates and, after complete evaporation and overheating in the gaseous state by the heat pump compressor, is compressed and brought to a higher pressure and temperature level. On the high-pressure side, the energy is output as heat to the washing, rinsing, and/or drying zone of the conveyor dishwasher, and in doing so condenses, liquefies, and subcools the refrigerant before it is released via an expansion valve, and thereby a lower pressure level is reached.

The heat pumping technology makes it possible to fully recover the energy contained in the exhaust air and thereby supply the exhaust air to the installation room (kitchen) in an energetically neutral manner. Thus, an on-site exhaust system is not required, because the exhaust air of the machine can be supplied directly to the room.

The exhaust air heat pumps currently in use are operated with the refrigerants R513a in Europe and R450a in North America. Compared to the previously used refrigerant R134a, these two refrigerants already have a significantly better GWP value of 631 and 605 compared to 1,430 at R134a.

"GWP" is the abbreviation for "Global Warming Potential," meaning the global warming or greenhouse gas potential of a substance. The GWP value of a refrigerant defines its relative greenhouse gas potential with respect to $CO_2$ (also referred to as $CO_2$ equivalent).

The refrigerants used thus far in heat pumps, in particular R513a and R450a, are also not harmless for various reasons of environmental and climate protection, because they still have a significant greenhouse effect.

Accordingly, there is an effort to develop a wastewater and/or exhaust air heat recovery system of an in particular commercial dishwasher, wherein the wastewater and/or exhaust air heat recovery system has as few potential negative environmental effects as possible.

In comparison to, for example, the refrigerant R513a or the refrigerant R450a, natural refrigerants, such as propane (R290a) or isobutane (R600a), have the advantage that their GWP value is significantly lower at 3 in each case; however, these refrigerants are slightly flammable in contrast to R513a and R450a, which, considering the operational safety of the system, carries some important changes to the known heat pumping concept of commercial dishwashers.

Here, it must be taken into account that heat pump systems with natural refrigerants, in particular hydrocarbons (such as propane R290a or isobutane R600a), may only be used in confined spaces, if at all.

Hydrocarbons are combustible and are classified as part of safety group A3 in accordance with DIN EN 378-1:2016+ A1:2020. According to the current product safety standard DIN EN 60335-2-40:2014-01, combustible refrigerants can only be used indoors at lower capacities and with a very low amount of cold filling (regardless of the size of the room). For larger filling amounts, special measures are required, for example forced venting.

Therefore, hydrocarbons are currently only used in lower-power heat pumps and, above all, in outdoor heat pumps. In the outdoors, filling amounts of up to 5 kg are permitted.

The natural refrigerant R744 ($CO_2$) is characterized due to its thermodynamic properties by high performance figures in use in domestic water heat pumps, whereas the potential for use in heating heat pumps for dishwashers is limited by the above-critical heat release. For $CO_2$ heat pumps, the energy efficiency is lower with lower temperature spreads, such as for the recovery of exhaust heat. Both R744 ($CO_2$) and R717 (ammonia) are used primarily in larger power ranges and currently have little relevance for heat pumps in dishwashers.

SUMMARY

Due to this problem, the problem addressed by the present invention is to specify a dishwasher, in particular a commercial dishwasher, having an exhaust air and/or waste heat recovery system, wherein the exhaust air/wastewater heat recovery system does not have the same problems relating to the environment and climate protection described in the case of the refrigerants R513a and R450a which have typically been used thus far, and wherein at the same time the heat recovery system can be used indoors or in a kitchen without additional structural measures.

Accordingly, the invention relates in particular to a dishwasher, in particular a commercial dishwasher, which is configured as a box-type dishwasher or as a conveyor dishwasher. The dishwasher comprises a heat recovery apparatus, configured so as to recover at least a portion of the thermal energy of the wastewater discharged or to be discharged from the dishwasher during operation of the dishwasher and/or at least a portion of the thermal energy of the exhaust air discharged or to be discharged from the dishwasher as utility heat during operation of the dishwasher and to transfer said thermal energy to at least one treatment liquid to be sprayed in the dishwasher, in particular washing liquid and/or rinsing liquid, and/or to a drying air used for drying in the dishwasher.

According to the invention, it is provided in particular that the heat recovery apparatus comprises a primary circulation system having a heat pump assembly and at least one secondary circulation system. The heat pump assembly is configured so as to transfer at least a portion of the thermal energy of the wastewater and/or the exhaust air to a refrigerant circulating in the primary circulation system.

On the other hand, the heat pump assembly comprises a heat exchange unit associated with the secondary circulation system, while the secondary circulation system comprises at least one second heat exchange unit that is in fluid communication with the heat exchange unit of the heat pump assembly. With the aid of the heat exchange unit of the heat pump assembly, at least a portion of the thermal energy transferred to the refrigerant circulating in the primary circulation system is transferred to a fluid, in particular liquid, carrier medium circulating in the secondary circulation system.

By means of the at least one heat exchange unit of the secondary circulation system, at least a portion of the thermal energy transferred to the carrier medium circulating in the secondary circulation system is transferred as utility heat to the at least one treatment liquid and/or to the drying air to be sprayed in the dishwasher.

The advantages achievable with the solution according to the invention are clear: in particular, the division of the heat recovery apparatus into a primary circulation system on the one hand and a secondary circulation system on the other hand allows for a natural hydrocarbon-based refrigerant, such as propane (R290a), isobutane (R600a), or propene (R441), to be used as the refrigerant circulating agent circulating in the primary system. The natural refrigerants have the advantage, for example in comparison to the refrigerant R513a or to the refrigerant R450a, that their GWP value is significantly lower at 3 in each case.

Natural and hydrocarbon-based refrigerants have the disadvantage, in comparison to for example R513a and R450a, that they are highly flammable, which carries some important changes to the known heat pump design for commercial dishwashers; however, by dividing the heat recovery apparatus into the primary circulation system and the secondary circulation system, it can be achieved in an easily realized yet effective manner that the refrigerant fill level can be limited to a minimum possible amount.

The invention is based on the finding, among other things, that the lower the amount of refrigerant that can escape in the event of leakage or the like, the lower the risk that a combustible mixture can then form with the ambient air, which poses a significant safety risk.

The design according to the invention, in particular of the heat recovery apparatus, primarily aims to keep the overall structure of the actual heat pump as compact as possible. On the one hand, this includes using as small components as possible in terms of volume. On the other hand, however, this design focuses above all on adapting the basic functional concept of the heat pump such that the heat pump is as compact as possible and without the long refrigerant lines previously customary, especially to the liquid tank (e.g. washing tank) and/or to the drying unit.

In this respect, the invention is in particular also based on the finding that, in the heat pump concepts known today for commercial dishwashers for heating of machine zones, such as the washing zone, rinsing zone, and drying zone, the respective machine zones are always directly exposed to the hot cooling agent of the heat pump. This is done by directing the hot refrigerant via relatively long refrigerant lines from the vaporizer device including the compressor directly into a heat exchanger in the washing tank or optionally additionally in the drying unit. There, the hot refrigerant then releases the energy to the washing water or optionally additionally to the drying air and then passes through further relatively long refrigerant lines back to the vaporizer device.

In order to realize an efficient heat transfer in the washing tank, a heat exchanger (condenser) with a comparatively large heat exchange surface region of approximately 1.5 to 2 $m^2$ is required, which, due to the current operating principle of directly exposing the heat exchanger to refrigerant, involves a very high refrigerant fill level.

According to the invention, the heating of the operating liquid of the dishwasher (rinsing liquid or washing liquid) or the drying air is no longer carried out directly by means of direct exposure to refrigerant in the respective treatment zone of the dishwasher, but rather by means of an additional secondary circulation. This makes it possible to design the entire heat pump as a small, compact unit, and especially a self-contained unit, for example on the roof of the conveyor dishwasher, without having to bring cooling agents directly to the consumers.

In the solution according to the invention, this is done by providing the secondary circuit, here with the aid of a further carrier medium, for example water. The carrier medium in the heat pump assembly is heated to approximately 80° ° C. using a compact plate heat exchanger and then directed into the heat exchanger, for example in the washing tank, with the aid of an additional circulator pump, where it then outputs energy to the washing water, before it flows back into the heat exchanger, which is preferably configured as a plate exchanger, of the heat pump assembly and the circuit begins again.

Preferably, the secondary circuit is a closed secondary circuit.

Alternatively, however, it is also conceivable to pump the operating liquid (washing liquid or rinsing liquid) to be heated directly in the circuit through the heat exchanger, which is preferably configured as a plate exchanger, of the heat pump assembly.

According to preferred implementations of the dishwasher, a natural refrigerant is used as the refrigerant circulating in the primary circulation system, in particular on the basis of hydrocarbons. Preferably, the refrigerant is propane or isobutane, or a mixture thereof.

The division of the heat recovery apparatus according to the invention into a primary circulation system and a secondary circulation system allows for the mass of the refrigerant circulating in the primary circulation system to be reduced to a maximum of 1,000 g and preferably to a maximum of 700 g and even more preferably to a maximum of 400 g and in particular to a maximum of 150 g.

The at least one second heat exchanger unit of the secondary circulation system is arranged in a washing tank of the dishwasher, in a fresh water tank of the dishwasher, and/or in a region for heating drying air.

According to preferred realizations of the dishwasher according to the invention, it is provided that the secondary circulation system comprises a first heat exchanger unit that is in fluid communication with the heat exchanger unit of the heat pump assembly over a first branch line system, or can be in fluid communication as needed with the heat exchanger unit of the heat pump assembly using a first valve assembly, and wherein the secondary circulation system further comprises at least a second heat exchanger unit that is in fluid communication with the heat exchanger unit of the heat pump assembly over a second branch line system that is in particular parallel to the first branch line system, or can be in fluid communication as needed with the heat exchanger unit of the heat pump assembly using a second valve assembly.

In particular, in order to realize the heat pump assembly, it is provided that it is divided into a high-pressure region and a low-pressure region.

According to design variants, the heat pump assembly comprises an evaporator unit associated with the low-pressure region of the heat pump assembly and configured such that at least a portion of the kinetic energy of the exhaust air and/or the wastewater of the dishwasher is transferred to the refrigerant circulating in the primary circulation system.

The heat pump assembly preferably further comprises a compressor unit that is in fluid communication with the evaporator unit and configured so as to compress the refrigerant having evaporated in the evaporator unit to a higher pressure level. Furthermore, a liquefier unit associated with the high-pressure region of the heat pump assembly and being in fluid communication with the compressor unit is used and is configured so as to liquefy at a high temperature the refrigerant compressed in the compressor unit, wherein at least a portion of the kinetic energy corresponding to the liquefaction temperature is transferred over the first heat exchanger unit to the carrier medium circulating in the secondary circulation system.

Finally, the heat pump assembly comprises an expansion valve unit in fluid communication with the liquefier unit and the evaporator unit, configured so as to decompress the refrigerant liquefied in the liquefier unit back to the evaporation pressure.

In this context, it is preferably provided in particular that the units of the heat pump assembly are accommodated in a separate housing, which is arranged on the dishwasher such that the units of the heat pump assembly are accessible from the outside.

In particular, the heat pump assembly is configured as an exchangeable or replaceable module of the dishwasher. The module can preferably be placed on the roof of the dishwasher and is thus simply completely replaceable in case of a service event without the need for a refrigeration technician, because the refrigeration system no longer has to be opened for this purpose (as has been the case up to now).

Through the secondary circuit, in particular by means of additional valve devices, a plurality of consumers or machine zones are approached in parallel in a simple to realize manner, so that the heating power can be divided as needed among one or more consumers without the need for complex circuits or controls in the cooling circuit.

BRIEF DESCRIPTION OF THE DRAWINGS

The invention is described in further detail in the following on the basis of exemplary embodiments with reference to the drawings.

The following are shown.

DETAILED DESCRIPTION

Figure 1:
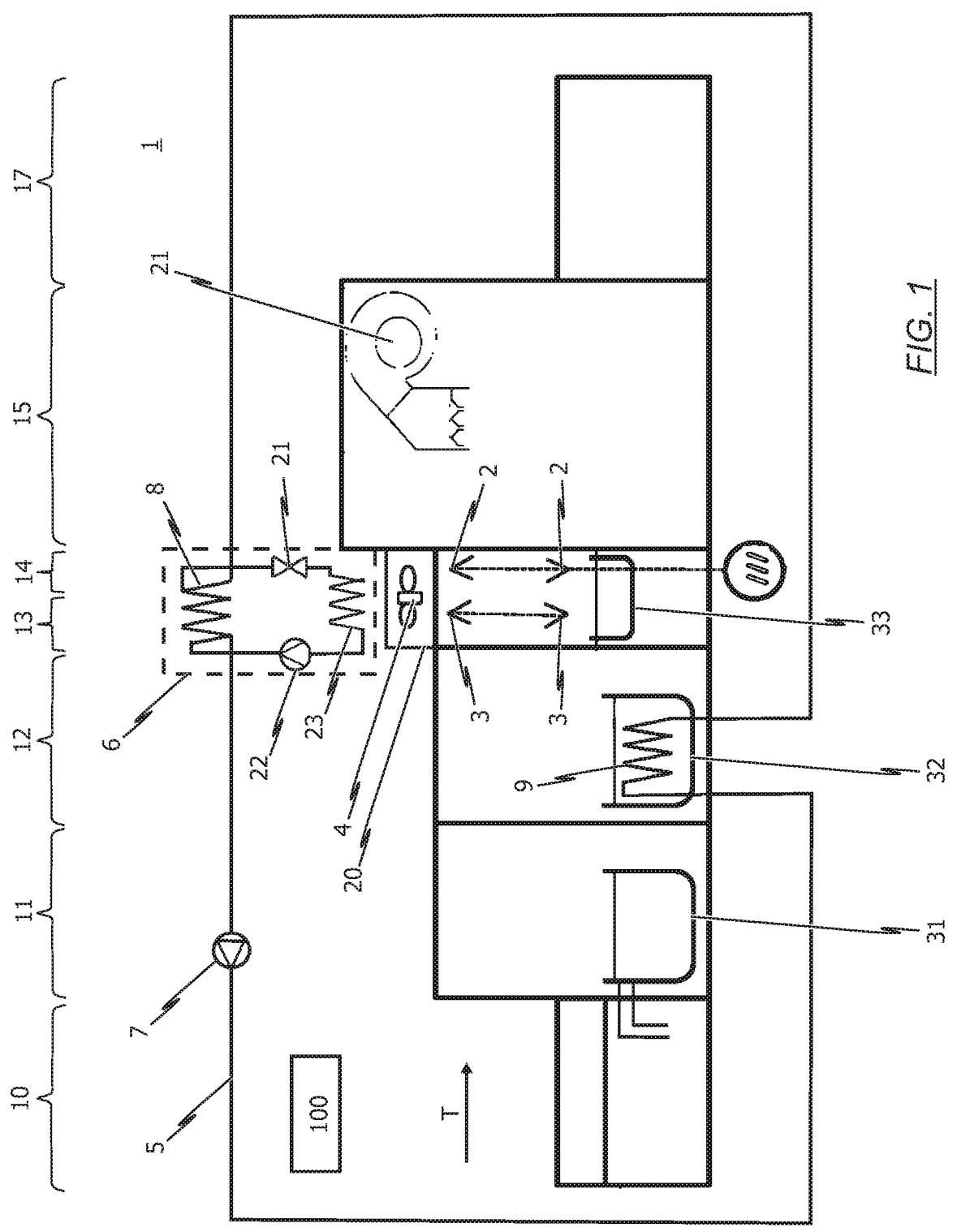
FIG. 1 schematically, an exemplary embodiment of the dishwasher according to the present invention, configured in this embodiment as a conveyor dishwasher.

In FIG. 1, as an example of the solution according to the invention, a conveyor dishwasher 1 is shown in a schematic longitudinal sectional view.

The exemplary embodiment of the conveyor dishwasher 1 shown in FIG. 1 comprises a pre-washing zone 11 as well as a main washing zone 12 located downstream of the pre-washing zone 11 when viewed in the conveying direction T of the washware. When viewed in the conveying direction T, in the conveyor dishwasher 1 shown in FIG. 1, downstream of the main washing zone 12, a post-washing or pre-rinsing zone 13 and a rinsing zone 14 are arranged.

When viewed in the conveying direction T, the washware received either directly on the conveyor belt or held by racks runs through an inlet tunnel 10, the subsequent pre-washing zone 11, the main washing zone 12, the post-washing or pre-rinsing zone 13, the rinsing zone 14, and through a drying zone 15, and into an outlet path 17.

Spraying nozzles are respectively associated with the aforementioned treatment zones 11, 12, 13, and 14 of the conveyor dishwasher 1, via which nozzles liquid is sprayed onto the washware conveyed by the conveyor belt through the respective treatment zones 11, 12, 13, and 14.

Although not shown in the drawings, it is preferred for the spraying nozzles, for example of the washing system associated with pre-washing zone 11 and main washing zone 12, to each be formed in an upper and lower washing tube such that corresponding washing arms are used in these treatment zones 11, 12. It is conceivable that the washing systems used comprise a plurality of washing tubes that form a washing arm battery, wherein the plurality of washing tubes are connected to a corresponding washing pump via a preferably common conduit system.

As indicated in FIG. 1, each washing zone (pre-washing zone 11, main washing zone 12, post-washing zone 13) is associated with a tank (washing tank 31, 32, 33) in which sprayed liquid is received and/or in which liquid is readied for the spraying nozzles of the relevant zones 11, 12, 13.

As used herein, the term "washing zone" generally refers to a treatment zone associated with a circulation tank (washing tank) and in which the liquid collected in the circulation tank of the treatment zone is circulated using a washing pump associated with the treatment zone. The term "washing zone" thus refers to the washing zone 11 and the main washing zone 12, but also a post-washing zone 13, which may be arranged downstream of the main washing zone 12 when viewed in the conveying direction T of the washware. The post-washing zone 13 is also sometimes referred to in the field of commercial washing as a "pump rinsing zone" or a "pre-washing zone." This is a circulation rinsing arranged upstream of the fresh water rinsing.

By contrast, the term "rinsing zone" as used herein is understood to mean a zone in which a fresh water rinsing takes place, in which the washware is sprayed with fresh water, which is optionally mixed with a rinse aid, in order to completely rid the washware of dirt particles and cleaning solution.

Thus, in the exemplary embodiments shown in the drawings, the final rinse takes place in the rinsing zone 14 before drying in the drying zone 15. The drying zone 15 is associated with a corresponding fan 21 in order to surround the cleaned washware with warm air and thereby dry it.

Furthermore, a control device 100 shown merely schematically in the drawings is provided, which, in the embodiment of the invention shown in the drawings (among other things), serves to control the respective washing pumps of the washing zones 11, 12, 13 appropriately during a washing process in order to supply washing liquid to the respective spraying nozzles at least temporarily via the associated conduit system.

In the conveyor dishwasher 1 shown in FIG. 1, rinsing liquid is sprayed onto the washware, not shown in FIG. 1, in the form of fresh water, which can be mixed with further chemical additives such as rinsing agents, via the spraying nozzles 2 of the rinsing zone 14 arranged above and below a conveyor belt. Although also not shown, laterally arranged spraying nozzles can also be provided in the rinsing zone 14.

A portion of the rinsing liquid sprayed in the rinsing zone 14 is conveyed from zone to zone in a cascading system counter to the conveying direction T of the washware. The remaining portion is guided directly into the pre-washing tank 31 of the pre-washing zone 11 via a valve and a bypass conduit (not shown).

The rinsing liquid sprayed in the rinsing zone 14 is collected in the tank (post-washing or pre-rinsing tank 33) of the post-washing or pre-rinsing zone 13, from which it is conveyed to the spraying nozzles 3 (post-washing or pre-rinsing nozzles) of the post-washing or pre-rinsing zone 13 via the washing pump belonging to the washing system of the post-washing or pre-rinsing zone 13. In the post-washing or pre-rinsing zone 13, washing liquid is rinsed off of the washware.

The liquid accumulating here flows into the washing tank 32 of the main washing zone 12, and a cleaning agent is typically added, and then the liquid is sprayed onto the washware via the spraying nozzles (washing nozzles) of the washing system belonging to the main washing zone 12 using a washing pump belonging to the washing system of the main washing zone 12.

From the washing tank 32 of the main washing zone 12, the washing liquid then flows into the pre-washing tank 31 of the pre-washing zone 11. In the pre-washing zone 11, with the aid of a washing pump belonging to the washing system of the pre-washing zone 11, the washing liquid collected in the pre-washing tank 31 is sprayed on the washware via the spraying nozzles (pre-washing nozzles) of the washing system belonging to the pre-washing zone in order to remove coarse soiling from the washware.

It is conceivable here that a portion of the washing liquid sprayed in the main washing zone 12 enters the washing tank (pre-washing tank 31) of the pre-washing zone 11 via an overflow system. Like the main washing zone 12, the pre-washing zone 11 can be equipped with a tank cover screen configured as a flat screen. This tank cover screen is preferably arranged above the washing tank (pre-washing tank 31) of the pre-washing zone 11 in order to separate dirt particles from the washing liquid sprayed in the pre-washing zone 11 and flowing back into the pre-washing tank 31 due to gravity. The mesh size of the tank cover screen is preferably in a range between approximately 1 mm and 4 mm.

The heated washing and rinsing liquid creates steam plumes (vapor) when sprayed within the washing and rinsing zones 11, 12, 13, 14 of the conveyor dishwasher 1. In order to prevent the escape of these steam plumes from the conveyor dishwasher 1, it is advantageous if, in the embodiment shown schematically in FIG. 1, the individual treatment zones, in particular the washing and rinsing zones 11, 12, 13, 14, are separated with curtains.

To extract the steam plumes (vapor) created during operation of the conveyor dishwasher 1 as well as the wet, warm air from the interior of the conveyor dishwasher 1, the conveyor dishwasher 1 is equipped with a machine-side exhaust system 20, which is designed so as to discharge at least a majority of the warm and moist air created during operation of the conveyor dishwasher 1 in the treatment zones 11, 12, 13, 14 as exhaust air from the respective treatment zones 11, 12, 13, 14 of the machine.

In the embodiment of the conveyor dishwasher 1 according to the invention shown in FIG. 1, the central exhaust system 20 is arranged in the region of post-washing and/or pre-rinsing zone 13 and rinsing zone 14. In the illustrated embodiment, the exhaust system 20 comprises a single exhaust fan 4, which is controllable via the control device 100 in order to be able to adjust the flow rate of the exhaust fan 4.

The exhaust system 20 is further associated with an exhaust air heat recovery system, which can preferably also be controlled via the control device 100 and serves to continuously, or as needed, draw thermal energy from the exhaust air to be discharged from the conveyor dishwasher 1 with the exhaust system 20 and thus cool the exhaust air to be discharged from the conveyor dishwasher 1.

The heat recovery system 50 used in the exemplary embodiment of the conveyor dishwasher 1 shown schematically in FIG. 1 will be described in further detail below.

Specifically, in the embodiment shown in FIG. 1, the heat recovery system 50 and/or the heat recovery apparatus are configured as an exhaust air heat recovery apparatus. However, it is also conceivable to use the heat recovery apparatus as a wastewater heat recovery apparatus.

The heat recovery apparatus (heat recovery system 50) used for the exhaust air heat recovery in FIG. 1 serves for energy recovery (and thus for conserving resources in the operation of the conveyor dishwasher 1) and in particular eliminate the need for on-site exhaust air output installations.

For this purpose, the embodiment of the conveyor dishwasher 1 according to the invention as shown schematically in FIG. 1 comprises the heat recovery apparatus (heat recovery system 50) already mentioned and configured as an exhaust air heat recovery system, which operates according to the principle of heat pumping technology.

The heat recovery apparatus (heat recovery system 50) is divided into a primary circulation system with a heat pump assembly 6 on one hand and a secondary circulation system 5 on the other.

The heat pump assembly 6 comprises a vaporizer unit 23, which is arranged, as schematically indicated in FIG. 1, in the machine-side exhaust system 20 or at the output of the machine-side exhaust system 20. In the vaporizer unit 23, a refrigerant, in particular a natural refrigerant, based on hydrocarbons, in particular propane or isobutane, evaporates when the vaporizer is surrounded by the humid exhaust air of the conveyor dishwasher 1.

In this way, in the operation of the conveyor dishwasher 1, the machine exhaust can be cooled from its original temperature of, for example, 45° C. to room temperature or about 18° C. at a relative humidity of 100%, such that the machine exhaust can then be immediately introduced into the room where the conveyor dishwasher 1 is installed (kitchen), and, in particular, an on-site exhaust system is not required.

After complete evaporation and overheating in the gaseous state, the refrigerant evaporated in the vaporizer unit 23 of the heat pump assembly 6 is compressed by a compressor unit 22, also associated with the heat pump assembly 6, and thus brought to a higher pressure and temperature level.

On the high-pressure side of the compressor unit 22, the thermal energy previously received from the humid exhaust air via a heat exchange unit 8 is then transferred indirectly to a carrier medium circulating in the secondary circulation system 5 and then via a heat exchange unit 9 belonging to the secondary circulation system 5 indirectly onto the washing liquid to be sprayed in the main washing zone 12.

Of course, however, it is also alternatively or additionally conceivable to output the thermal energy absorbed from the moist, warm exhaust air as utility heat or heat output to the drying air to be introduced in the drying zone 15 using the fan 21 and/or to the rinsing liquid (fresh water) to be sprayed.

In this context, it is particularly worth mentioning that all components 8, 21, 22, 23 of the heat pumping assembly 6 based on the principle of heat pumping technology are accommodated in a housing, which can preferably be placed as a module on the machine roof of the conveyor dishwasher 1.

In the example shown in FIG. 1, the secondary circulation system 5 is configured as a closed circulation system in which a carrier medium is circulated using a pump 7 associated with the secondary circulation system 5. The carrier medium can be, for example, water or a water-based carrier medium.

With the aid of a heat exchange unit 8, which is in particular configured as a plate heat exchanger, at least a portion of the thermal energy of the refrigerant circulating in the primary circulation system is transferred to the carrier medium. The heated carrier medium is then supplied with the aid of the pump 7 associated with the secondary circulation system 5 of a heat exchange unit 9 arranged, for example in the washing tank 32 of the conveyor dishwasher 1, in which a portion of the kinetic energy of the heated carrier medium is transferred to the washing liquid.

Figure 2:
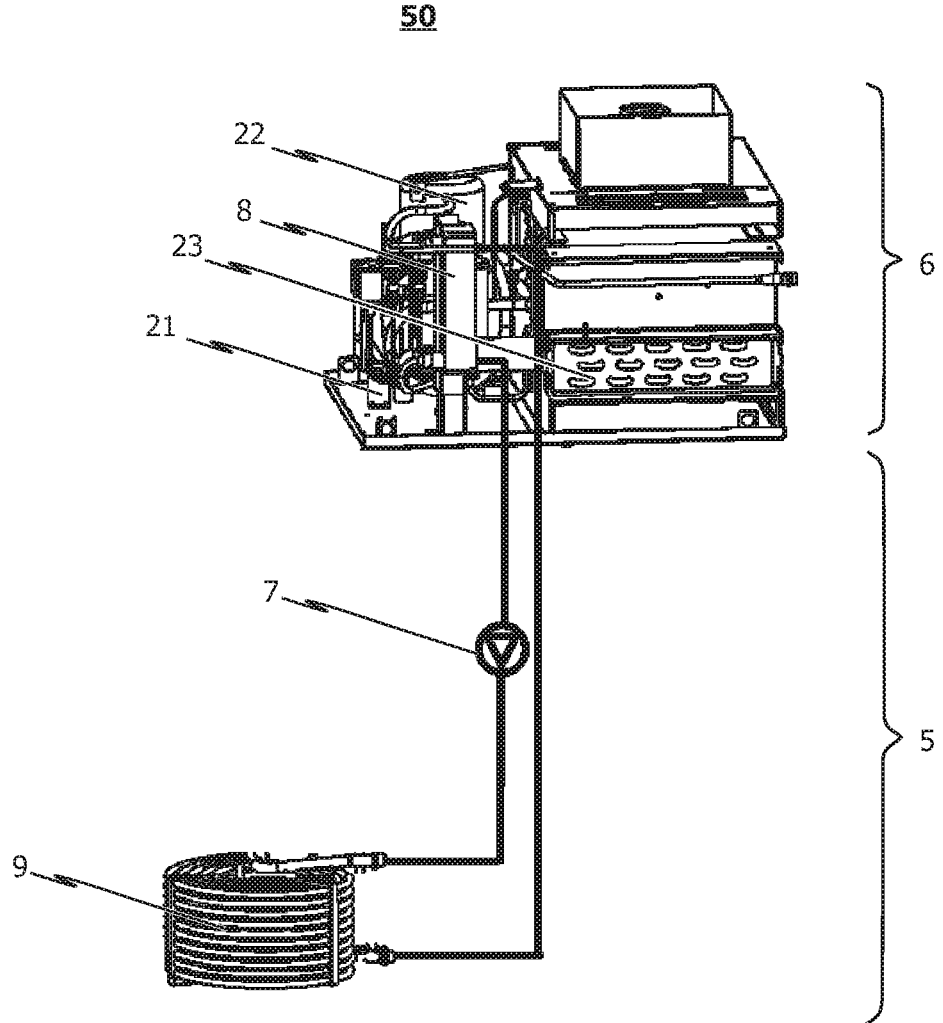
FIG. 2 schematically, and in an isometric view, an exemplary embodiment of a heat recovery apparatus used, for example, in the conveyor dishwasher according to FIG. 1.

In FIG. 2, a heat recovery apparatus (heat recovery system 50) is shown schematically and in an isometric view, which can also be used with the conveyor dishwasher 1 according to FIG. 1.

It can be seen that the heat recovery apparatus (heat recovery system 50) is divided into a primary circulation system with a heat pump assembly 6 on one hand and a secondary circulation system 5 on the other hand. The heat pump assembly 6 is configured as a compact module and comprises a corresponding vaporizer unit 23, a compressor unit 22 that is in fluid communication with the vaporizer unit 23, a liquefier unit that is in fluid communication with the compressor unit 22, and an expansion valve unit 21 that is in fluid communication with the liquefier unit 8 and the vaporizer unit 23.

In addition, the heat pump assembly 6 comprises a heat exchanger 8, particularly designed as a plate heat exchanger, via which at least a portion of the kinetic energy recovered from the exhaust air and/or from the wastewater of the dishwasher is transferred to the carrier medium of the secondary circuit 5.

The secondary circuit itself comprises a pump 7 for supplying the carrier medium heated in the heat exchanger 8 of the heat pump assembly 6 to a second heat exchanger 9, which is arranged for example in a washing tank 32 of the dishwasher 1. There, the previously heated carrier medium of the secondary circulation system 5 outputs at least a portion of its kinetic energy to, for example, the washing liquid in the washing tank 32, after which the then cooled carrier medium is conveyed back to the heat exchanger 8 of the heat pump assembly 6.

The invention is not limited to the exemplary embodiments shown in the drawings, but results when all of the features disclosed herein are considered together.

In particular, the heat recovery system 50 described above or the heat recovery apparatus (heat recovery system 50) described above can also be used with corresponding box-type dishwashers.

The invention claimed is:

1. A dishwasher, adapted as a program machine or as a transport washer, wherein the dishwasher comprises a heat recovery apparatus, adapted to recover at least a portion of a thermal energy of the wastewater discharged, or to be discharged, from the dishwasher during operation of the dishwasher and/or at least a portion of a thermal energy of the exhaust air discharged, or to be discharged, from the dishwasher as utility heat during operation of the dishwasher and to transfer said thermal energy to at least one treatment liquid to be sprayed in the dishwasher, and/or to a drying air used for drying in the dishwasher, wherein the heat recovery apparatus comprises a primary circulation system having a heat pump assembly and at least one secondary circulation system, wherein the heat pump assembly is adapted to transfer at least a portion of the reclaimed thermal energy of the wastewater and/or the exhaust air to a refrigerant circulating in the primary circulation system, and wherein the heat pump assembly comprises a heat exchanger unit associated with the secondary circulation system and the secondary circulation system comprises at least one heat exchanger unit in fluid communication with the heat exchanger unit of the heat pump assembly, wherein, with the aid of the heat exchanger unit of the heat pump assembly, at least a portion of the thermal energy transferred to the refrigerant circulating in the primary circulation system is transferred to a fluidic carrier medium circulating in the secondary circulation system, and wherein, with the aid of the at least one heat exchanger unit of the secondary circulation system, at least a portion of the thermal energy transferred to the carrier medium circulating in the secondary circulation system is transferred as utility heat to the at least one treatment liquid and/or to the drying air to be sprayed in the dishwasher;

wherein the at least one heat exchanger unit of the secondary circulation system is arranged in a washing tank of the dishwasher, in a fresh water tank of the dishwasher or in an area for heating drying air.

2. The dishwasher according to claim 1,
   wherein the refrigerant circulating in the primary circulation system is a natural refrigerant, belonging to the group R290a or R600a.

3. The dishwasher according to claim 1,
   wherein the mass of the refrigerant circulating in the primary circulation system is at most 1,000 g.

4. The dishwasher according to claim 1,
   wherein the secondary circulation system is a closed-loop circulation system.

5. The dishwasher according to claim 4, wherein the carrier medium circulating in the secondary circulation system is a water-based carrier medium or water.

6. The dishwasher according to claim 1,
   wherein the secondary circulation system is adapted as an open-loop circulation system, and wherein the carrier medium circulating in the secondary circulation system is a treatment liquid to be sprayed in the dishwasher.

7. The dishwasher according to claim 1,
   wherein the secondary circulation system comprises a pump, controlled by a control device, by which the carrier medium can be conveyed by the secondary circulation system.

8. The dishwasher according to claim 1, wherein the heat exchanger unit of the heat pump assembly comprises a plate heat exchanger.

9. The dishwasher according to claim 1, wherein the secondary circulation system comprises a first heat exchanger unit that is in fluid communication with the heat exchanger unit of the heat pump assembly over a first branch line system, or can be in fluid communication with the heat exchanger unit of the heat pump assembly using a first valve assembly, and wherein the secondary circulation system further comprises at least a second heat exchanger unit that is in fluid communication with the heat exchanger unit of the heat pump assembly over a second branch line system that is parallel to the first branch line system, or can be in fluid communication with the heat exchanger unit of the heat pump assembly using a second valve arrangement.

10. The dishwasher according to claim 1,
   wherein the primary circulation system of the heat pump assembly of the heat recovery apparatus is divided into a high-pressure side and a low-pressure side, and wherein the heat pump assembly comprises:
   an evaporator unit associated with the low-pressure side of the heat pump assembly and adapted such that at least a portion of the thermal energy of the exhaust air and/or the wastewater of the dishwasher is transferable to the refrigerant circulating in the primary circulation system while at least partially evaporating the refrigerant at the same time;

a compressor unit in fluid communication with the evaporator unit and adapted to compress the refrigerant having at least partially evaporated in the evaporator unit to a higher pressure level;

a condenser unit associated with the high-pressure side of the heat pump assembly and being in fluid communication with the compressor unit and adapted to liquefy the refrigerant compressed in the compressor unit, wherein at least a portion of the thermal energy corresponding to the condensation temperature is transferred over the heat exchanger unit of the heat pump assembly to the carrier medium circulating in the secondary circulation system; and an expansion valve unit in fluid communication with the condenser unit and the evaporator unit, adapted to decompress the refrigerant liquefied in the condenser unit back to the evaporation pressure.

11. The dishwasher according to claim 10, wherein the units of the heat pump assembly are accommodated in a housing arranged on the dishwasher such that the units of the heat pump assembly are accessible from the outside.

12. The dishwasher according to claim 1, wherein the heat pump assembly is adapted as an exchangeable or replaceable module of the dishwasher.

13. The dishwasher according to claim 1, wherein the dishwasher is adapted as a transport dishwasher with a conveyor apparatus for conveying the items of washware through multiple individual treatment zones, wherein the transport dishwasher comprises at least one washing zone, in which washing liquid from a washing tank associated with at least one washing zone is sprayed onto the washware, wherein the transport dishwasher further comprises at least one rinsing zone arranged downstream from the at least one washing zone when viewed in the transport direction (T) of the washware, in which rinsing liquid is sprayed onto the washware, and wherein the transport dishwasher further comprises an exhaust system for discharging exhaust air from the transport dishwasher.

14. The dishwasher according to claim 13, wherein the heat recovery apparatus is adapted as an exhaust air heat recovery apparatus for transferring at least a portion of the thermal energy of the exhaust air discharged, or to be discharged, from the transport dishwasher as utility heat to the rinsing liquid to be sprayed in the at least one rinsing zone and/or to the washing liquid to be sprayed in the at least one washing zone.

15. A dishwasher, adapted as a program machine or as a transport washer, wherein the dishwasher comprises a heat recovery apparatus, adapted to recover at least a portion of a thermal energy of the wastewater discharged, or to be discharged, from the dishwasher during operation of the dishwasher and/or at least a portion of a thermal energy of the exhaust air discharged, or to be discharged, from the dishwasher as utility heat during operation of the dishwasher and to transfer said thermal energy to at least one treatment liquid to be sprayed in the dishwasher, and/or to a drying air used for drying in the dishwasher, wherein the heat recovery apparatus comprises a primary circulation system having a heat pump assembly and at least one secondary circulation system, wherein the heat pump assembly is adapted to transfer at least a portion of the reclaimed thermal energy of the wastewater and/or the exhaust air to a refrigerant circulating in the primary circulation system, and wherein the heat pump assembly comprises a heat exchanger unit associated with the secondary circulation system and the secondary circulation system comprises at least one heat exchanger unit in fluid communication with the heat exchanger unit of the heat pump assembly, wherein, with the aid of the heat exchanger unit of the heat pump assembly, at least a portion of the thermal energy transferred to the refrigerant circulating in the primary circulation system is transferred to a fluidic carrier medium circulating in the secondary circulation system, and wherein, with the aid of the at least one heat exchanger unit of the secondary circulation system, at least a portion of the thermal energy transferred to the carrier medium circulating in the secondary circulation system is transferred as utility heat to the at least one treatment liquid and/or to the drying air to be sprayed in the dishwasher;

wherein the primary circulation system is a closed-loop circulation system and the secondary circulation system is a closed-loop circulation system.

16. The dishwasher according to claim 15, wherein the at least one heat exchanger unit of the secondary circulation system is arranged in (i) a washing tank of the dishwasher, (ii) a fresh water tank of the dishwasher or (iii) an area for heating drying air.

* * * * *